United States Patent
Winkler

(10) Patent No.: US 10,169,740 B2
(45) Date of Patent: Jan. 1, 2019

(54) TAG CLOUD BUDDY LIST FOR MESSAGING CONTACTS

(75) Inventor: Tim P. Winkler, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/651,103

(22) Filed: Dec. 31, 2009

(65) Prior Publication Data

US 2011/0161329 A1    Jun. 30, 2011

(51) Int. Cl.
*G06F 17/30* (2006.01)
*G06Q 10/10* (2012.01)

(52) U.S. Cl.
CPC ..... *G06Q 10/107* (2013.01); *G06F 17/30864* (2013.01)

(58) Field of Classification Search
CPC ............ G06Q 10/107; G06F 17/30864; G06F 17/30867
USPC ......................................................... 707/748
See application file for complete search history.

(56) References Cited

U.S. PATENT DOCUMENTS

| | | | | |
|---|---|---|---|---|
| 7,167,910 B2 * | 1/2007 | Farnham | ............... | G06F 3/0481 709/223 |
| 8,140,619 B2 * | 3/2012 | Lyle | ..................... | H04L 12/581 709/204 |
| 8,863,216 B2 * | 10/2014 | Amento | ............. | H04N 7/17318 725/116 |
| 2006/0035632 A1 | 2/2006 | Sorvari et al. | | |
| 2006/0048076 A1 | 3/2006 | Vronay et al. | | |
| 2006/0136584 A1 * | 6/2006 | Decker | ................. | H04L 12/185 709/224 |
| 2007/0106780 A1 | 5/2007 | Farnham et al. | | |
| 2007/0276846 A1 | 11/2007 | Ramanathan et al. | | |
| 2008/0071929 A1 | 3/2008 | Motte et al. | | |
| 2008/0072145 A1 | 3/2008 | Blanchard et al. | | |

(Continued)

FOREIGN PATENT DOCUMENTS

TW            200638221           8/2005

OTHER PUBLICATIONS

Wang, Jun et al., "Distributed Collaborative Filtering for Peer-to-Peer File Sharing Systems", Proceedings of the 2006 ACM symposium on Applied computing, pp. 1026-1030, SAC'06 Apr. 23-27, 2006.*

(Continued)

*Primary Examiner* — Shahid A Alam
(74) *Attorney, Agent, or Firm* — Steven M. Greenberg, Esq.; Shutts & Bowen LLP

(57) ABSTRACT

Embodiments of the present invention provide a method, system and computer program product for tag cloud buddy lists. In an embodiment of the invention, a method for tag cloud buddy list management can be provided. The method can include loading a list of contacts in a messaging system executing in memory by a processor of a computer, rating each of the contacts in the list according to at least one criteria, and visually emphasizing each of the contacts differently in a buddy cloud for a user interface to the messaging system according to different ratings applied to each of the contacts. Optionally, contacts with ratings failing to exceed a threshold value can be filtered from the buddy cloud. In this regard, the threshold value can be selected with a slider control displayed in the messaging system.

17 Claims, 1 Drawing Sheet

(56) References Cited

U.S. PATENT DOCUMENTS

| | | | |
|---|---|---|---|
| 2008/0155080 A1 | 6/2008 | Marlow et al. | |
| 2008/0207271 A1* | 8/2008 | Krutik et al. | 455/566 |
| 2008/0275846 A1* | 11/2008 | Almas | G06F 17/30867 |
| | | | 707/706 |
| 2008/0282139 A1 | 11/2008 | Davis | |
| 2009/0006442 A1 | 1/2009 | Anderson et al. | |
| 2009/0029674 A1* | 1/2009 | Brezina | H04M 15/00 |
| | | | 455/405 |
| 2009/0177744 A1 | 7/2009 | Marlow et al. | |
| 2009/0182727 A1* | 7/2009 | Majko | G06F 17/30554 |
| | | | 707/723 |
| 2009/0234874 A1 | 9/2009 | Sylvain | |
| 2010/0062753 A1* | 3/2010 | Wen et al. | 455/418 |
| 2013/0297615 A1* | 11/2013 | Stewart | G06F 17/30321 |
| | | | 707/741 |

OTHER PUBLICATIONS

SAASU; "Contact List"; http://www.saasu.com/help/context/contact-list/; last visited on Dec. 7, 2009.

* cited by examiner

TAG CLOUD BUDDY LIST FOR MESSAGING CONTACTS

BACKGROUND OF THE INVENTION

Field of the Invention

The present invention relates to the field of computer based messaging and more particularly to buddy list management for messaging systems.

Description of the Related Art

The recent rapid development of the Internet has led to advanced modes of both asynchronous collaboration and synchronous, real-time collaboration able to fulfill the near real-time and real-time communicative requirements of the modern computing participant. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments including electronic mail (e-mail) and instant messaging.

In both an e-mail system and an instant messaging system, commonly used addresses for collaborative partners are stored and maintained in an address book referred to as a "buddy list". New entries generally are added to the buddy list in only one of two ways: manually, or in response to receiving an e-mail or a chat request from another party. In either circumstance, the composition and addressing of a new e-mail message, or the establishment of a subsequent conversation in an instant messaging session with the same collaborator can be as simple as locating and selecting the address of the collaborator in the buddy list.

The widespread popularity of asynchronous and synchronous communications in lieu of telephonic communications, however, has led to the bloating of the venerable buddy list. Specifically, the traditional buddy list is nothing more than a two level and sometimes three level tree in which different contacts are listed (usually alphabetically) and oftentimes grouped according to classification such as the "North Office" and the "South Office" or the "ABC Team" or "Human Resources". When the number of contacts or groups in the buddy list exceeds just a dozen or so names, the tree can become lengthy while remaining shallow. To locate a contact of interest, then requires substantial scrolling and the desired contact can be lost in a sea of contacts in the buddy list.

End users attempt to maintain the utility of the buddy list by "pruning" the buddy list from time to time. Pruning a buddy list generally requires the end user to consider every reference in a buddy list to determine whether interactions past, present or future, warrant the maintenance of a contact in the buddy list. As one can imagine, pruning a buddy list of hundreds of contacts can be both time consuming and inaccurate. In many cases, contacts can be removed from the buddy list unintentionally while other contacts will needlessly remain in the buddy list.

BRIEF SUMMARY OF THE INVENTION

Embodiments of the present invention address deficiencies of the art in respect to buddy list management and provide a novel and non-obvious method, system and computer program product for tag cloud buddy lists. In an embodiment of the invention, a method for tag cloud buddy list management can be provided. The method can include loading a list of contacts in a messaging system executing in memory by a processor of a computer, rating each of the contacts in the list according to at least one criteria, and visually emphasizing each of the contacts differently in a buddy cloud according to different ratings applied to each of the contacts. Optionally, contacts with ratings failing to exceed a threshold value can be filtered from the buddy cloud. As an example, the threshold value can be selected with a slider control displayed in the messaging system.

In another embodiment of the invention, a messaging data processing system can be provided. The system can include a messaging system executing in memory by at least one processor of a computer and a message store communicatively coupled to the messaging system. The messaging system can include, by way of example, an e-mail system, an instant messaging system, or even an audio/video chat system. A buddy cloud module also can be provided. The buddy cloud module can include program code that when executed by the processor of the computer can load a list of contacts in the messaging system, rate each of the contacts in the list according to at least one criteria, and visually emphasize each of the contacts differently in a buddy cloud for the messaging system according to different ratings applied to each of the contacts.

In one aspect of the embodiment, the criteria as applied to a contact in the contact list can include a length of a message transcript received from the contact in the contact list. Alternatively, the criteria as applied to a contact in the contact list can include a date or time of the receipt of a message from the contact in the contact list. In another aspect of the embodiment, the program code of the buddy cloud module is further enabled to filter from the buddy cloud contacts with ratings failing to exceed a threshold value. To that end, a slider control in the messaging system can be configured to select the threshold value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for tag cloud buddy lists. In accordance with an embodiment of the invention, each contact in a buddy list in a messaging system can be compared to a specified criteria or criterion predictive of a frequency of future interaction, such as a length of a past message transcript, or a past number of messages exchanged. A tag cloud can be generated to include the contacts and each contact can be visually emphasized according to the degree to which each contact matches the specified criteria or criterion. Further, the tag cloud can be filtered to include only those contacts meeting a threshold number of the criteria or criterion. Thereafter, the tag cloud can be displayed as a buddy cloud in lieu of a buddy list in the messaging system.

Figure 1:
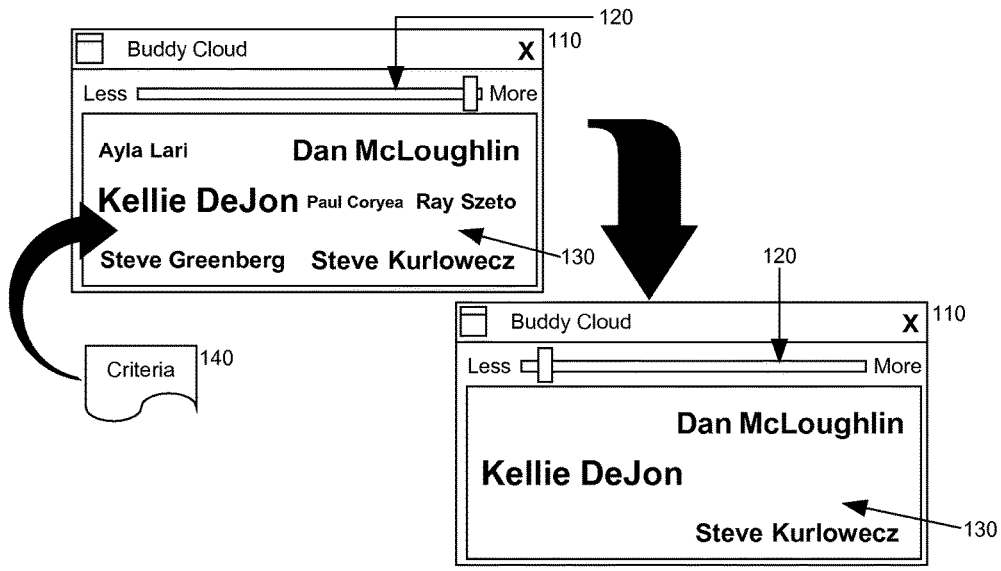
FIG. 1 is pictorial illustration of a tag cloud buddy list.

In further illustration, FIG. 1 is pictorial illustration of a tag cloud buddy list. As shown in FIG. 1, a buddy cloud 130 can be generated in a buddy list user interface 110. The buddy cloud 130 can include a listing of different contacts of an end user, with each contact having a different degree of visual emphasis varying according to one or more criteria 140. The criteria 140 can include, by way of example, a length of a transcript of a previous message from the contact to the end user, a frequency of exchange of messages within a fixed period of time, a most recent exchange of messages, or a number of messages previously transmitted between the contact and the end user.

Optionally, each of the contacts in the buddy cloud 130 can be rated according to a degree in which each of the contacts meets the criteria 140. As such, a filter control 120 can be provided in the buddy list user interface 110. The filter control 120 can permit the establishment of a threshold value for ratings applied to the contacts. Each rating for each contact can be compared to the threshold established by the filter control 120 and only those contacts with ratings that exceed the threshold value can remain visible in the buddy cloud 130. Thus, the filter control 120 can be used to filter from view in the buddy cloud 130 those contacts of less relevance to the end user than other contacts remaining in view in the buddy cloud 130.

Figure 2:
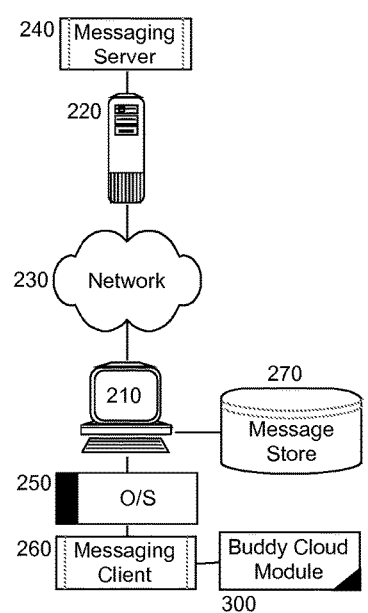
FIG. 2 is a schematic illustration of a messaging system configured for tag cloud buddy list management; and, FIG. 3 is a flow chart illustrating a process for tag cloud buddy list management.

The process described in connection with FIG. 1 can be implemented in a messaging data processing system. In further illustration, FIG. 2 schematically depicts a messaging data processing system configured for tag cloud buddy list management. The system can include a host computer 210 with at least one processor and memory configured for communicative coupling to messaging server 240 in a server computer 220 over computer communications network 230. The host computer 210 can support the execution of an operating system 250 in the memory of the host computer 210. The operating system 250 in turn can host the operation of messaging client 260, such as an e-mail client, or an instant messaging client.

Of note, buddy cloud module 300 can be coupled to messaging client 260. The buddy cloud module 300 can include program code enabled to rate different contacts in a contact list according to criteria applied to messages from the contacts in message store 270. The program code further can be enabled to visually distinguish each of the contacts in a tag cloud according to a rating applied to the contact so that contacts more closely meeting the criteria are visually emphasized in the tag cloud and those less closely meeting the criteria are visually de-emphasized in the tag cloud. The program code yet further can be enabled to filter from the tag cloud those contacts with corresponding ratings falling below a threshold value. Finally, the program code can be enable to render the tag cloud in the messaging client 260 in substitute for a buddy list as a buddy cloud.

Figure 3:
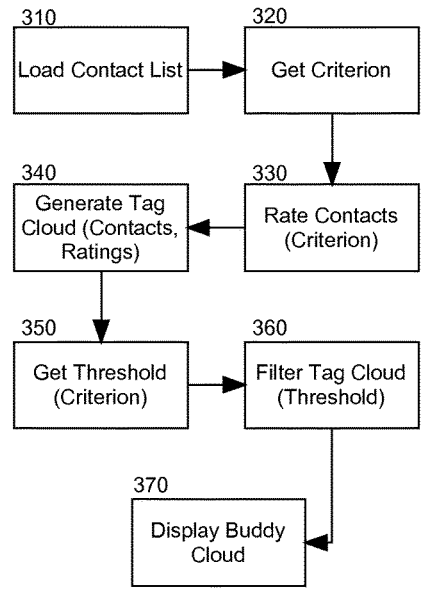

In even yet further illustration of the operation of the buddy cloud module 300, FIG. 3 is a flow chart illustrating a process for tag cloud buddy list management. Beginning in block 310, a contact list can be loaded for an end user of a messaging system such as that executing in a messaging client, or that executing in a messaging server. In block 320, one or more criteria can be established, such as a length of a message last received from a contact, a sum total length of all messages received from a contact, a date of a most recent received message from a contact, a number of messages received from a contact, to name only a few examples. In block 330, each of the contacts in the contact list can be rated according to the criteria. For example, the rating can be the date on which a last message was received from a contact, a number of words in a last message received from a contact, a number of messages received from a contact in a specified period of time, as would depend upon the nature of the criterion. To the extent that multiple criterion are applied, the ratings can be combined into a single rating.

In block 340, a tag cloud can be generated for the contacts by visually emphasizing those contacts of a higher rating than those of a lower rating. Optionally, in block 350, a threshold rating can be specified and, in block 360, to the extent any contact has a rating that does not exceed the threshold rating, the contact can be excluded from the tag cloud. Finally, in block 370 the tag cloud can be displayed in a user interface to the messaging system in lieu of a buddy list as a buddy cloud.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for tag cloud buddy list management, the method comprising:

loading a list of contacts in a messaging system executing in memory by a processor of a computer;

receiving transcripts of messages received from each of the contacts in the list and determining a length for each of the received transcripts;

rating each of the contacts in the list according to the lengths;

generating a buddy cloud including the list by presenting in a display of the computer a tag cloud visual representation of the contacts in the list with an importance of each contact being shown in the tag cloud with a different font size based upon a corresponding rating along with a slider control specifying a desired number of contacts to be displayed in the buddy cloud; and, filtering by the processor of the computer from the tag cloud visual representation of the buddy cloud to include only those of the contacts of a threshold rating so that the buddy cloud presented in the display omits from display those of the contacts with a corresponding rating below the threshold rating;

displaying the buddy cloud in substitute to a multi-level scrollable tree comprising a buddy list of the messaging system; and, initiating a message to a contact associated with one of the contacts displayed in the tag cloud responsive to a selection of the one of the contacts.

2. The method of claim 1, wherein the messaging system is an e-mail system.

3. The method of claim 1, wherein the messaging system is an instant messaging system.

4. The method of claim 1, wherein visually emphasizing each of the contacts comprises displaying contacts of higher ratings in a larger font size, and contacts of a lower rating in a smaller font size.

5. The method of claim 1, further comprising filtering from the buddy cloud contacts with ratings failing to exceed a threshold value.

6. The method of claim 5, further comprising selecting the threshold value with a slider control displayed in the messaging system.

7. A messaging data processing system comprising:
a messaging system executing in memory by at least one processor of a computer;
a message store communicatively coupled to the messaging system; and,
a buddy cloud module comprising program code that when executed by the processor of the computer is enabled to load a list of contacts in the messaging system, to both receive transcripts of messages received from each of the contacts in the list and also determine a length for each of the received transcripts, to rate each of the contacts in the list according to the lengths, to generate a buddy cloud including the list, by presenting in a display of the computer a tag cloud visual representation of the contacts in the list with an importance of each contact being shown in the tag cloud with a different font size based upon a corresponding rating along with a slider control specifying a desired number of contacts to be displayed in the buddy cloud, to filter by the processor of the computer from the tag cloud visual representation of the buddy cloud to include only those of the contacts of a threshold rating so that the buddy cloud presented in the display omits from display those of the contacts with a corresponding rating below the threshold rating, to display the buddy cloud in substitute to a multi-level scrollable tree comprising a buddy list of the messaging system and to initiate a message to a contact associated with one of the contacts displayed in the tag cloud responsive to a selection of the one of the contacts.

8. The system of claim 7, wherein the messaging system is a messaging client.

9. The system of claim 7, wherein the messaging system is a messaging server.

10. The system of claim 7, wherein the program code of the buddy cloud module is further enabled to filter from the buddy cloud contacts with ratings failing to exceed a threshold value.

11. The system of claim 10, further comprising a slider control in the messaging system configured to select the threshold value.

12. A computer program product comprising a non-transitory computer usable storage device storing computer usable program code for tag cloud buddy list management, the computer program product comprising:
computer usable program code for loading a list of contacts in a messaging system executing in memory by a processor of a computer;
computer usable program code for receiving transcripts of messages received from each of the contacts in the list and determining a length for each of the received transcripts;
computer usable program code for rating each of the contacts in the list according to the lengths;
computer usable program code for generating a buddy cloud including the list by presenting in a display of the computer a tag cloud visual representation of the contacts in the list with an importance of each contact being shown in the tag cloud with a different font size based upon a corresponding rating along with a slider control specifying a desired number of contacts to be displayed in the buddy cloud;
computer usable program code for filtering by the processor of the computer from the tag cloud visual representation of the buddy cloud to include only those of the contacts of a threshold rating so that the buddy cloud presented in the display omits from display those of the contacts with a corresponding rating below the threshold rating;
computer usable program code for displaying the buddy cloud in substitute to a multi-level scrollable tree comprising a buddy list of the messaging system; and,
computer usable program code for initiating a message to a contact associated with one of the contacts displayed in the tag cloud responsive to a selection of the one of the contacts.

13. The computer program product of claim 12, wherein the messaging system is an e-mail system.

14. The computer program product of claim 12, wherein the messaging system is an instant messaging system.

15. The computer program product of claim 12, wherein the computer usable program code for visually emphasizing each of the contacts, comprises computer usable program code for displaying contacts of higher ratings in a larger font size, and contacts of a lower rating in a smaller font size.

16. The computer program product of claim 12, further comprising computer usable program code for filtering from the buddy cloud contacts with ratings failing to exceed a threshold value.

17. The computer program product of claim 16, further comprising computer usable program code for selecting the threshold value with a slider control displayed in the messaging system.

* * * * *